(12) United States Patent
Faehling et al.

(10) Patent No.: US 6,398,534 B1
(45) Date of Patent: Jun. 4, 2002

(54) TAKE-OFF APPARATUS FOR BLOWN, PLASTIC SHEETS

(75) Inventors: Gerd Faehling, Hannef; Gerd Kasselmann, Hagen a.T.W.; Richard Zimmermann, Bonn, all of (DE)

(73) Assignee: Klaus Reinhold Maschinen-und Geraetebau GmbH, Lengerich (DE)

( * ) Notice: Subject to any disclaimer, the term of this patent is extended or adjusted under 35 U.S.C. 154(b) by 0 days.

(21) Appl. No.: 09/413,345

(22) Filed: Oct. 6, 1999

(30) Foreign Application Priority Data

Oct. 6, 1998 (DE) ..................................... 298 17 800 U

(51) Int. Cl.[7] ............................................... B29C 53/20
(52) U.S. Cl. .................. 425/72.1; 425/326.1; 425/377; 425/387.1; 425/392
(58) Field of Search ............................. 425/72.1, 326.1, 425/377, 387.1, 392

(56) References Cited

U.S. PATENT DOCUMENTS 4,676,728 A * 6/1987 Planeta ..................... 425/387.1
5,567,445 A * 10/1996 Cree et al. .................. 425/72.1
5,611,473 A * 3/1997 Reinhold et al. ........... 226/170
5,674,540 A * 10/1997 Sensen et al. .............. 425/72.1

* cited by examiner

Primary Examiner—Nam Nguyen
Assistant Examiner—Donald Heckenberg
(74) Attorney, Agent, or Firm—Jordan and Hamburg LLP

(57) ABSTRACT

A take-off apparatus for plastic blown sheet that is collapsed has a deflecting roller rotatably mounted for transporting the blown sheet and an air turning bar for receiving the blown sheet from the deflecting bar along a transport plane defined therebetween. The blown sheet passes around a peripheral portion of the air turning bar thereby defining a support arc region of the at least one air turning bar about which the blown sheet is supported. The air turning bar has air outlet openings disposed in the support arc region through which compressed air is ejected to support the blown sheet. The air turning bar has an arc-shaped axis defining a plane of curvature which is oriented such that the peripheral portion presents a concave surface in which the air outlet openings are disposed and which opposes the blown sheet.

15 Claims, 2 Drawing Sheets

TAKE-OFF APPARATUS FOR BLOWN, PLASTIC SHEETS

BACKGROUND OF THE INVENTION

The invention relates to a take-off apparatus for blown plastic sheets, produced by an extruder using a blow molding process with a collapsing device for the blown sheet, which is supplied with an expanded circular cross section, and with at least one rotatably mounted deflecting roller as well as with at least one non-rotatingly supported air tuning bar for transporting the collapsed blown sheet further.

For take-off apparatuses of this type, which can be constructed reversibly for distributing thickness tolerances, frozen into the blown sheet, over the whole width of the winder of the reeled film that is to be produced, the deflecting roller as well as the air turning bar usually are constructed cylindrically. During the operation of the take-off apparatus, compressed air emerges through the air outlet openings of the air turning bar, which allows the collapsed blown sheet, which is being brought along, to be suspended on a cushion of air as it loops around the air turning bar, in order to achieve frictionless guidance of the blown sheet about the non-rotating turning bar. If the pressure of the air emerging and, with that, of the cushion of air, is set too low, the blown sheet comes into contact with the air turning bar as it wraps around it, as a result of which scratches and similar damage appear on the blown sheet. In the case of blown sheets with strongly adhering surfaces, the latter may even adhere regionally, resulting in an interruption to the production process.

For this reason, efforts are made to work with the strongest possible cushion of air at the turning bar or bars, so that scratches on the surface of the sheet and interruptions to the production by adhesion of the blown sheet at an air turning bar are avoided. In this connection, however, it has been noted that the collapsed blown sheet, in the case of a strong cushion of air, inflates greatly on the reverse side of the air turning bar, that is, in the running direction of the sheet, behind the air nozzle region looped by the blown sheet after the latter has left the zenith of the air turning bar, with the result that the side folding edges of the collapsed blown sheet approach one another a little. Subsequently, if the blown sheet, which is narrower because the lateral folding edges are mutually approaching one another, runs onto a downstream, cylindrical deflecting roller, folding of the central region of the blown sheet occurs during the flat contact looping of the deflecting roller. This, in turn, has a negative effect on the quality of the blown sheet produced. In addition, due to the strong inflation of the blown sheet on the reverse side of the air turning bar, strong leakage losses of compressed air occur, which can be compensated for only with difficulty, since an increased ejection of compressed air in the looping region of the air turning bars can lead to unsteady running of the blown sheet with negative effects on the production process.

Furthermore, take-off apparatuses have already become known, for which the deflecting roller and/or the air turning bar has a diameter, which differs over its length, for bringing about a concave or convex surface or peripheral surface of the deflecting roller and/or of the air turning bar. Admittedly, due to this shape of the peripheral surface, adhesion of the blown sheet in the looping region is counteracted by the cushion of air applied. However, a convex or concave arc-shaped cross-sectional profile is impressed on the blown sheet on the reverse side of a correspondingly constructed air turning bar. This, in turn, causes the side folded edges of the collapsed blown sheet to approach one another with the danger that folds will be formed in the middle region of the sheet during the further transport of the latter. In addition, there is a considerable leak of compressed air on the reverse side of the air turning bar in the middle or lateral regions of the latter, depending on whether this bar is equipped with a concave or convex peripheral surface.

SUMMARY OF THE INVENTION

It is an object of the invention to provide a take-off apparatus of the generic type, for which, while maintaining a sufficiently strong cushion of air to avoid adhesion of the collapsed blown sheet at the air turning bar in the looping region of the latter, high losses of compressed air due to leakage behind the air turning bar and the formation of an undesirable fold in the central region of the blown sheet during the further transport of the latter are avoided.

Pursuant to the invention, this objective is accomplished by providing a configuration of a take-off apparatus for plastic blown sheets, produced by an extruder in the blow molding process, with a collapsing device for the blown sheet, which is supplied with an expanded circular cross section, and with at least one rotatably mounted deflecting roller as well as with at least one non-rotatingly supported air turning bar for transporting the collapsed blown sheet further, the air turning bar, in a region of its peripheral surface, looped by the collapsed blown sheet during its transport, being provided with an arrangement of air outlet openings, characterized in that the air turning bar, with a constant external diameter, has a course, which is arc-shaped in the axial direction and defines a plane of curvature with a concave side and a convex side of the air turning bar, and in that the air outlet openings are disposed on the concave side of the air turning bar. Owing to the fact that, in the case of this configuration, the air outlet openings of the air turning bar are disposed on the concave side of the latter, that is, on the side facing the chord of an imaginary, associated circular section, the space is created, which is required for applying a sufficiently large cushion of air, which avoids adhesion of the collapsed blown sheet, as the latter loops around the air turning bar, even when the surface has an adhesive nature. At the same time, the external diameter of the air turning bar, which is constant throughout, ensures that the blown sheet, at the zenith of the air turning bar, runs off from this in a straight plane over the convex side of the air turning bar, so that an inflation of the blown sheet on the reverse side of the air turning bar by entrained compressed air from the looping region, in conjunction with an inwards deformation of the peripheral surface of the turning bar, is counteracted. With that, the cause for an undesirable fold formation in the central region of the blown sheet, during the further transport of the latter, is also excluded, so that the prerequisites for a defect-free production of blown film, even of those with strongly adhering surfaces, are created.

In general, the plane of curvature of the air turning bar is disposed parallel to a transporting plane of the collapsed blown sheet, which is specified by a deflecting roller disposed upstream. In the case of a take-off apparatus, which is commonly used and which takes up the collapsed sheet, transported perpendicularly upwards from the extruder, this means a horizontal arrangement of the deflecting roller or rollers and, correspondingly, a horizontal arrangement of the air turning bar or bars for transporting the collapsed blown sheet by the take-off apparatus over conveying path sections, which in turn are horizontal.

An adjustable support of the air tuning bar or bars advantageously is such that its plane of curvature can be adjusted from a basic position, which is parallel to the transporting plane of the collapsed blown sheet and usually horizontal, into a position inclined to this at an angle of about 10° to 20°. By these means, the cushion of air can be regulated and the course of the blown sheet optimized.

The height of the arc, presented by the air turning bar, that is, the measure of the distance between the apex of the arc and the chord of an imaginary, associated circular section, depends on the length of the air turning bar, which in turn depends on the maximum width of the blown sheet produced. The arc height is only a few millimeters and usually ranges from about 1 to 10 mm.

In order to avoid losses of compressed air and factors that interfere with the transporting behavior of the blown sheet in the looping region of the air-guiding roller when transporting narrow blown sheets, the width of which is less than the length of turning bars designed for a blown sheet of maximum width, the air outlet openings, which are not required in the looping region of the air turning bar outside of the transporting region, can be closed off, for example, by a diaphragm device, mounted in the interior of the air turning bar.

Further details and advantageous effects of the invention arise from the description of the object of the invention below, in conjunction with the drawing, in which an example of a take-off apparatus of the present invention is illustrated diagrammatically.

DETAILED DESCRIPTION OF THE PREFERRED EMBODIMENTS

Figure 1:
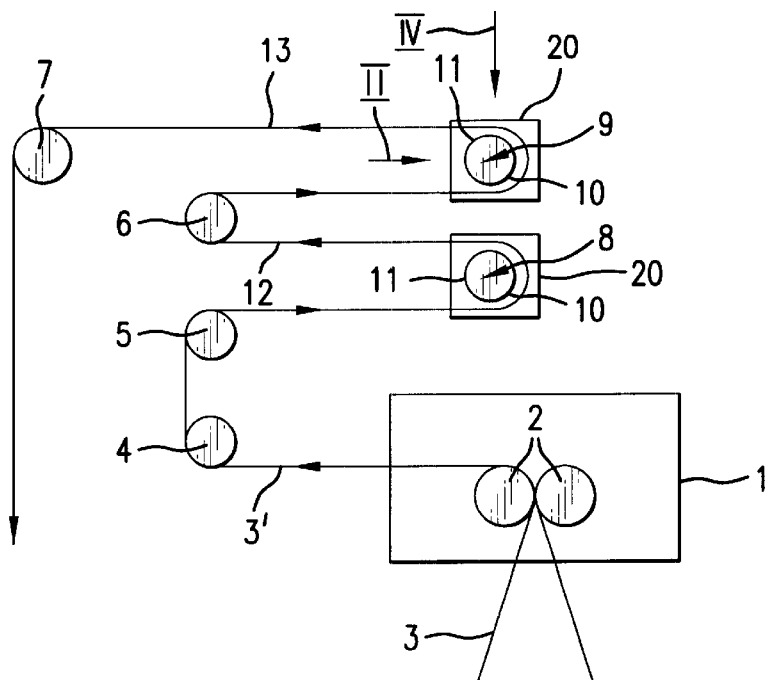
FIG. 1 shows a side view of an embodiment of a reversing take-off apparatus for blown plastic sheets produced by a blown film extruder.

In FIG. 1, a reversing take-off apparatus for plastic blown sheets, produced by an extruder in the blow molding process, is shown strictly diagrammatically only with the parts required for understanding the invention. The take-off apparatus comprises a collapsing device 1 with a pair of nip rolls 2 for the blown sheet 3, which is supplied with an expanded circular cross section from the blown film die of an extruder (not shown). The blown sheet 3 is collapsed between the nip rolls 2 and then, as a flat sheet 3', passed through a reversing system of rotatably mounted deflecting rollers 4, 5, 6 and 7 and non-rotating, supported air turning bars 8 and 9 for distributing the thickness tolerances and then supplied in the direction of the arrow to a winding device.

Figures 2, 3:
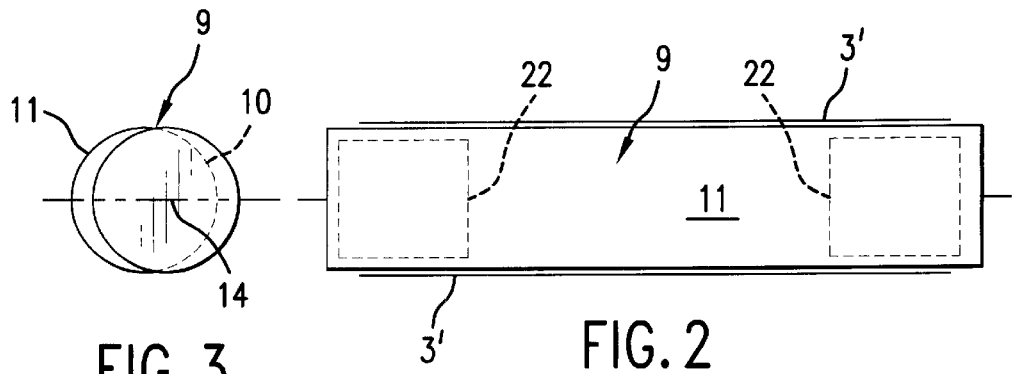
FIG. 2 shows a side view of an air turning bar on a scale larger than that of FIG. 1.
FIG. 3 show an end view of the air turning bar of FIG. 2.
Figure 4:
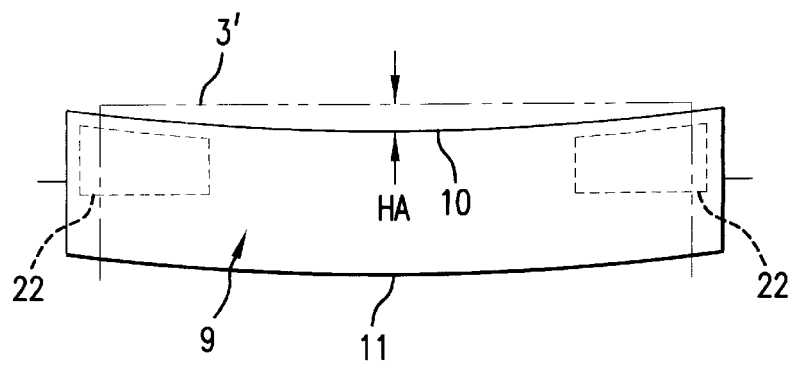
FIG. 4 shows a plan view of the air turning bar of FIGS. 2 and 3.
Figure 5:
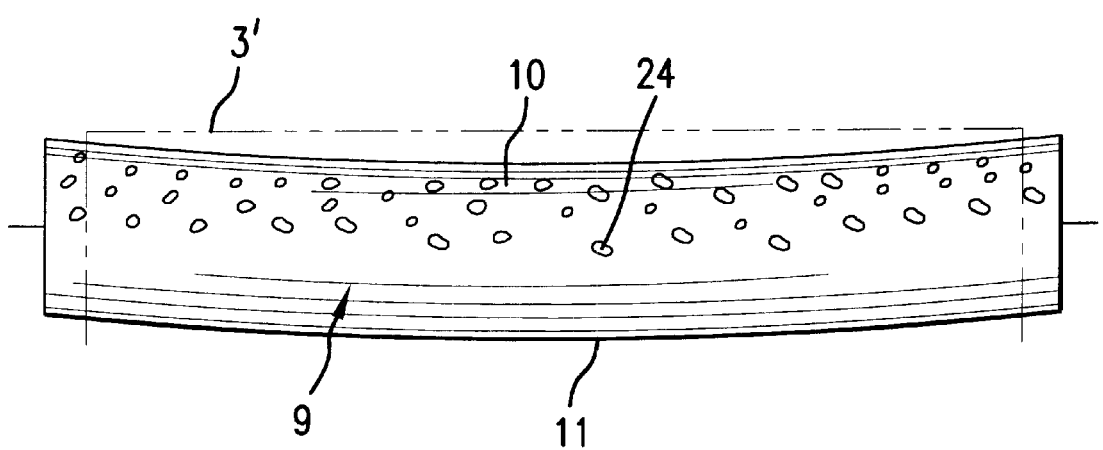
FIG. 5 is a plain view of the turning bar, similar to FIG. 4, but also showing the outlet openings.

The deflecting rollers 5 to 7 are formed by straight cylinders, that is, cylinders which have a constant external diameter. The air turning bars 8 and 9, in turn, have a constant external diameter over their whole length. However, in the axial direction, they have an arc-shaped course, which defines a plane of curvature 14. By these means, as shown in FIGS. 2 to 4 in an exaggerated manner for the air turning bar 9, each air turning bar has a concave side 10 and a convex side 11. Air outlet openings 24 of the air turning bars 8, 9 are disposed on the concave side 10 of the air turning bars 8, 9 in a region of their peripheral surface of about 180°, which is looped by the collapsed blown sheet 3' during the transport of the latter by the take-off apparatus.

It can be seen from FIG. 4, which corresponds to a plan view in the direction of the arrow IV in FIG. 1, that a sufficiently strong cushion of air can be formed on the concave side 10 of the air turning bar 9 and that this cushion of air prevents adhesion of the blown sheet 3', which loops around the air turning bar in this region. It can be seen from FIG. 2, which corresponds to a side view of the air turning bar 9 in the direction of the arrow II of FIG. 1, that a blown sheet 3', in the region of the zenith of the air turning bar 9, runs precisely straight and horizontally from the latter. The same is true for the air turning bar 8.

The deflecting rollers 4 to 7 and the air turning bars 8 to 9 all have a horizontal alignment in the take-off apparatus. Correspondingly, the plane of curvature of the air turning bars 8, 9 lies in a horizontal plane. Because the blown sheet 3' runs off straight from the air turning bars 8 and 9, inflation of the blown sheet 3', which is transported further behind the air turning bars 8 and 9 in each case on a horizontal section 12 and 13 respectively in the direction of the arrow, is avoided. With that, fold formation in the central region of the blown sheet 3' during the flat looping of the in each case adjoining cylindrical deflecting rollers 6 and 7 respectively is also avoided.

Referring to FIG. 1, adjustable support devices 20 are optionally provided for the air turning bars, 8 and 9, such that its plane of curvature can be adjusted from a basic position, which is parallel to the transporting plane of the collapsed blown sheet 3' and usually horizontal, into a position inclined to this at an angle of about 10° to 20°. By these means, the cushion of air can be regulated and the course of the blown sheet 3' optimized.

An arc height HA of an arc as shown in FIG. 4, presented by the air turning bar, 8, 9, that is, the measure of a distance between an apex of the arc and a chord of an imaginary, associated circular section, depends on a length of the air turning bar 8,9, which in turn depends on the maximum width of the blown sheet produced. The arc height HA is only a few millimeters and usually ranges from about 1 to 10 mm.

In order to avoid losses of compressed air and factors that interfere with the transporting behavior of the blown sheet 3' in the looping region of the air turning roller 8, 9, when transporting narrow blown sheets, a width of which is less than the length of turning bars 8, 9, designed for a blown sheet of maximum width, the air outlet openings 24, which are not required in the looping region of the air turning bar outside of the transporting region, can be closed off, for example, by a diaphragm device 22, mounted in the interior of the air tuning bar 8, 9.

What is claimed is:

1. A take-off apparatus for plastic blown sheet, produced by an extruder in the blow molding process, comprising:

a collapsing device for the blown sheet, which is supplied with an expanded circular cross section;

at least one rotatably mounted deflecting roller for transporting the blown sheet from the collapsing device;

at least one non-rotatingly supported air turning bar (8, 9) for transporting the collapsed blown sheet further;

the air turning bar (8, 9), in a region of its peripheral surface looped by the collapsed blown sheet during its transport, being provided with an arrangement of air outlet openings;

the air turning bar (8, 9) having a constant external diameter, and a course which is arc-shaped in an axial direction of the air turning bar (8, 9) and defines a plane of curvature (14) with a concave side (10) and a convex side (11) of the air turning bar (8, 9); and the air outlet openings being disposed on the concave side (10) of the air turning bar (8, 9).

2. The apparatus of claim 1, wherein the plane of curvature (14) of the air turning bar (8, 9) is disposed parallel to a conveying plane of the collapsed blown sheet (3') defined by the at least one rotatably mounted deflecting roller (5, 6) and the air turning bar (8, 9).

3. The apparatus of claim 2, further comprising an adjustable support device for the air turning bar (8, 9) permitting adjustment of the plane of curvature (14) from a basic position, parallel to the conveying plane of the collapsed blown sheet (3'), into a position inclined to relative to the conveying plane.

4. The apparatus of claim 3, wherein the concave side (10) defines an arc having a height of about 1 to 10 mm.

5. The apparatus of claim 4, further comprising a diaphragm device for selectively closing the air outlet openings of the air turning bar (8, 9), which are not required.

6. The apparatus of claim 1, further comprising an adjustable support device for the air turning bar (8, 9) permitting adjustment of the plane of curvature (14) from a basic position, parallel to the conveying plane of the collapsed blown sheet (3'), into a position inclined to relative to the conveying plane.

7. The apparatus of claim 1, wherein the concave side (10) defines an arc having a height of about 1 to 10 mm.

8. The apparatus of claim 2, wherein the concave side (10) defines an arc having a height of about 1 to 10 mm.

9. The apparatus of claim 1, further comprising a diaphragm device for selectively closing the air outlet openings of the air turning bar (8, 9), which are not required.

10. The apparatus of claim 2, further comprising a diaphragm device for selectively closing the air outlet openings of the air turning bar (8, 9), which are not required.

11. The apparatus of claim 3, further comprising a diaphragm device for selectively closing the air outlet openings of the air turning bar (8, 9), which are not required.

12. A take-off apparatus for plastic blown sheet that is collapsed, comprising:

at least one deflecting roller rotatably mounted for transporting the blown sheet;

at least one air turning bar for receiving the blown sheet from the at least one deflecting bar along a transport plane defined therebetween, the blown sheet passing around a peripheral portion of said at least one air turning bar thereby defining a support arc region of said at least one air turning bar about which the blown sheet is supported;

the at least one air turning bar having air outlet openings disposed in the support arc region through which compressed air is ejected to support the blown sheet; and said at least one air turning bar having an arc-shaped axis defining a plane of curvature and oriented such that said peripheral portion presents a concave surface in which said air outlet openings are disposed and which opposes the blown sheet, wherein the at least one air turning bar has a constant external diameter along an axial direction thereof.

13. The apparatus of claim 12, wherein the plane of curvature is disposed substantially parallel to the transport plane.

14. A take-off apparatus for plastic blown sheet that is collapsed, comprising:

at least one deflecting roller rotatably mounted for transporting the blown sheet;

at least one air turning bar for receiving the blown sheet from the at least one deflecting bar along a transport plane defined therebetween, the blown sheet passing around a peripheral portion of said at least one air turning bar thereby defining a support arc region of said at least one air turning bar about which the blown sheet is supported;

the at least one air turning bar having air outlet openings disposed in the support arc region through which compressed air is ejected to support the blown sheet;

said at least one air turning bar having an arc-shaped axis defining a plane of curvature and oriented such that said peripheral portion presents a concave surface in which said air outlet openings are disposed and which opposes the blown sheet; and an adjustable support device for supporting the at least one air turning bar permitting adjustment of an angle defined by the plane of curvature and the transport plane, wherein the at least one air turning bar has a constant external diameter along an axial direction thereof.

15. The apparatus of claim 14 wherein the concave surface defines an arc having a height of about 1 to 10 mm.

* * * * *